United States Patent
Ji et al.

(10) Patent No.: US 10,306,594 B2
(45) Date of Patent: May 28, 2019

(54) UPLINK COVERAGE ENHANCEMENTS

(71) Applicant: QUALCOMM Incorporated, San Diego, CA (US)

(72) Inventors: Tingfang Ji, San Diego, CA (US); Peter Gaal, San Diego, CA (US); Hao Xu, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

(21) Appl. No.: 14/060,924

(22) Filed: Oct. 23, 2013

(65) Prior Publication Data
US 2014/0119331 A1 May 1, 2014

Related U.S. Application Data

(60) Provisional application No. 61/720,361, filed on Oct. 30, 2012.

(51) Int. Cl.
*H04W 72/04* (2009.01)
*H04W 72/02* (2009.01)
*H04W 72/12* (2009.01)

(52) U.S. Cl.
CPC ........ *H04W 72/02* (2013.01); *H04W 72/1268* (2013.01)

(58) Field of Classification Search
CPC ............. H04W 72/02; H04W 72/0413; H04W 72/1268; H04W 72/12; H04W 72/1205; H04W 72/1257; H04W 72/1263
(Continued)

(56) References Cited

U.S. PATENT DOCUMENTS 6,978,143 B1    12/2005  Vialen
7,990,928 B2     8/2011  Kwon et al.
(Continued)

FOREIGN PATENT DOCUMENTS

CN         1385039 A    12/2002
CN       101193438 A     6/2008
(Continued)

OTHER PUBLICATIONS

Interdigital Communications et al., "Link-level evaluation results for improved LTE UL VoIP coverage", 3GPP Draft; R1-122566, 3rd Generation Partnership Project (3GPP). Mobile Competence Centre; 650, Route Des Lucioles; F-06921 Sophia-Antipolis Cedex; France, vol. RAN WG1. No. Prague. Czech Republic; 20120521-20120525, pp. 1-6, May 12, 2012 (May 12, 2012), XP050600753.
(Continued)

*Primary Examiner* — Pao Sinkantarakorn
(74) *Attorney, Agent, or Firm* — Patterson & Sheridan, LLP

(57) ABSTRACT

Aspects of the present disclosure provided techniques for enhancing uplink coverage. A method for wireless communications by a wireless device is provided. The method generally includes obtaining a payload of data to be transmitted to a base station, selecting at least one uplink control channel and a number of transmission time intervals (TTIs), and conveying the data in the at least one uplink control channel over the number of TTIs, wherein different portions of the data are conveyed in different TTIs.

30 Claims, 6 Drawing Sheets

(58) Field of Classification Search
USPC .................................................. 370/330, 336
See application file for complete search history.

(56) References Cited

U.S. PATENT DOCUMENTS

| | | | |
|---|---|---|---|
| 8,171,372 B2 | 5/2012 | Pan | |
| 2009/0245190 A1 | 10/2009 | Higuchi et al. | |
| 2010/0157895 A1* | 6/2010 | Pani .................... | H04W 52/346 |
| | | | 370/328 |
| 2010/0192035 A1 | 7/2010 | Sagfors et al. | |
| 2012/0002616 A1 | 1/2012 | Ishii et al. | |
| 2012/0020309 A1 | 1/2012 | Malladi et al. | |
| 2012/0039182 A1 | 2/2012 | Zhou et al. | |
| 2013/0242889 A1* | 9/2013 | Khoryaev ......... | H04W 52/0235 |
| | | | 370/329 |
| 2015/0023281 A1* | 1/2015 | Wu ................... | H04W 72/0473 |
| | | | 370/329 |

FOREIGN PATENT DOCUMENTS

| | | |
|---|---|---|
| CN | 101247171 A | 8/2008 |
| CN | 101507344 A | 8/2009 |
| CN | 102056112 A | 5/2011 |
| CN | 102711268 A | 10/2012 |
| EP | 2056616 A1 | 5/2009 |
| JP | 2014529235 A | 10/2014 |
| WO | WO-2011020735 A2 | 2/2011 |
| WO | WO-2013027018 A1 | 2/2013 |

OTHER PUBLICATIONS

International Search Report and Written Opinion—PCT/US2013/066622—ISA/EPO—dated Jan. 30, 2014.

* cited by examiner

UPLINK COVERAGE ENHANCEMENTS

CLAIM OF PRIORITY UNDER 35 U.S.C. § 119

This application claims benefit of U.S. Provisional Patent Application Ser. No. 61/720,361, filed Oct. 30, 2012, which is herein incorporated by reference in its entirety.

BACKGROUND

I. Field

Certain aspects of the present disclosure generally relate to wireless communications and, more particularly, to techniques for conveying payloads of data in bundled uplink control channels over multiple extended transmission time intervals (TTIs).

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices comprise user equipments (UEs) and remote devices. A UE is a device that operates under direct control by humans. Some examples of UEs include cellular phones, smart phones, personal digital assistants (PDAs), wireless modems, handheld devices, tablets, laptop computers, netbooks, smartbooks, ultrabooks, etc. A remote device is a device that operates without being directly controlled by humans. Some examples of remote devices include sensors, meters, location tags, etc. A remote device may communicate with a base station, another remote device, or some other entity. Machine type communication (MTC) refers to communication involving at least one remote device on at least one end of the communication.

SUMMARY

Certain aspects of the present disclosure provide a method for wireless communications by a wireless device. The method generally includes obtaining a payload of data to be transmitted to a base station, selecting at least one uplink control channel and a number of transmission time intervals (TTIs), and conveying the data in the at least one uplink control channel over the number of TTIs, wherein different portions of the data are conveyed in different TTIs.

Certain aspects of the present disclosure provide a method for wireless communications by a base station. The method generally includes receiving a payload of data from a wireless device, the payload of data received in at least one uplink control channel over a number of transmission time intervals (TTIs), wherein different portions of the payload of data are conveyed in different TTIs, and processing multiple transmissions of the at least one uplink control channel received over the different TTIs to assemble the payload of data.

Certain aspects of the present disclosure provide an apparatus for wireless communications by a wireless device. The apparatus generally includes means for obtaining a payload of data to be transmitted to a base station, means for selecting at least one uplink control channel and a number of transmission time intervals (TTIs), and means for conveying the payload of data in the at least one uplink control channel over the number of TTIs, wherein different portions of the payload of data are conveyed in different TTIs.

Certain aspects of the present disclosure provide an apparatus for wireless communications by a base station. The apparatus generally includes means for receiving a payload of data from a wireless device, the payload of data received in at least one uplink control channel over a number of transmission time intervals (TTIs), wherein different portions of the payload of data are conveyed in different TTIs and means for processing multiple transmissions of the at least one uplink control channel received over the different TTIs to assemble the payload of data.

Certain aspects of the present disclosure provide an apparatus for wireless communications by a wireless device. The apparatus generally includes at least one processor configured to obtain a payload of data to be transmitted to a base station, to select at least one uplink control channel and a number of transmission time intervals (TTIs), and to convey the payload of data in the at least one uplink control channel over the number of TTIs, wherein different portions of the payload of data are conveyed in different TTIs.

Certain aspects of the present disclosure provide an apparatus for wireless communications by a base station. The apparatus generally includes at least one processor configured to receive a payload of data from a wireless device, the payload of data received in at least one uplink control channel over a number of transmission time intervals (TTIs), wherein different portions of the payload of data are conveyed in different TTIs, and to process multiple transmissions of the at least one uplink control channel received over the different TTIs to assemble the payload of data.

Certain aspects of the present disclosure provide a computer-readable medium for wireless communication. The computer-readable medium generally includes code to obtain a payload of data to be transmitted to a base station, code to select at least one uplink control channel and a number of transmission time intervals (TTIs), and code to convey the payload of data in the at least one uplink control channel over the number of TTIs, wherein different portions of the payload of data are conveyed in different TTIs.

Certain aspects of the present disclosure provide a computer-readable medium for wireless communication. The computer-readable medium generally includes code to receive a payload of data from a wireless device, the payload of data received in at least one uplink control channel over a number of transmission time intervals (TTIs), wherein different portions of the payload of data are conveyed in different TTIs, and code to process multiple transmissions of the at least one uplink control channel received over the different TTIs to assemble the payload of data.

Numerous other aspects are provided including methods, apparatus, systems, computer program products, computer-readable medium, and processing systems.

DETAILED DESCRIPTION

Aspects of the present disclosure provided techniques for enhancing uplink coverage by conveying data in bundled uplink control channels over multiple transmission time intervals (TTIs). For example, existing physical uplink control channel (PUCCH) or physical random access channel (PRACH) may each carry a number of bits, depending on the format, and may be aggregated. The number of TTIs and the particular channel format used may be determined based on a various factors.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below.

Figure 1:
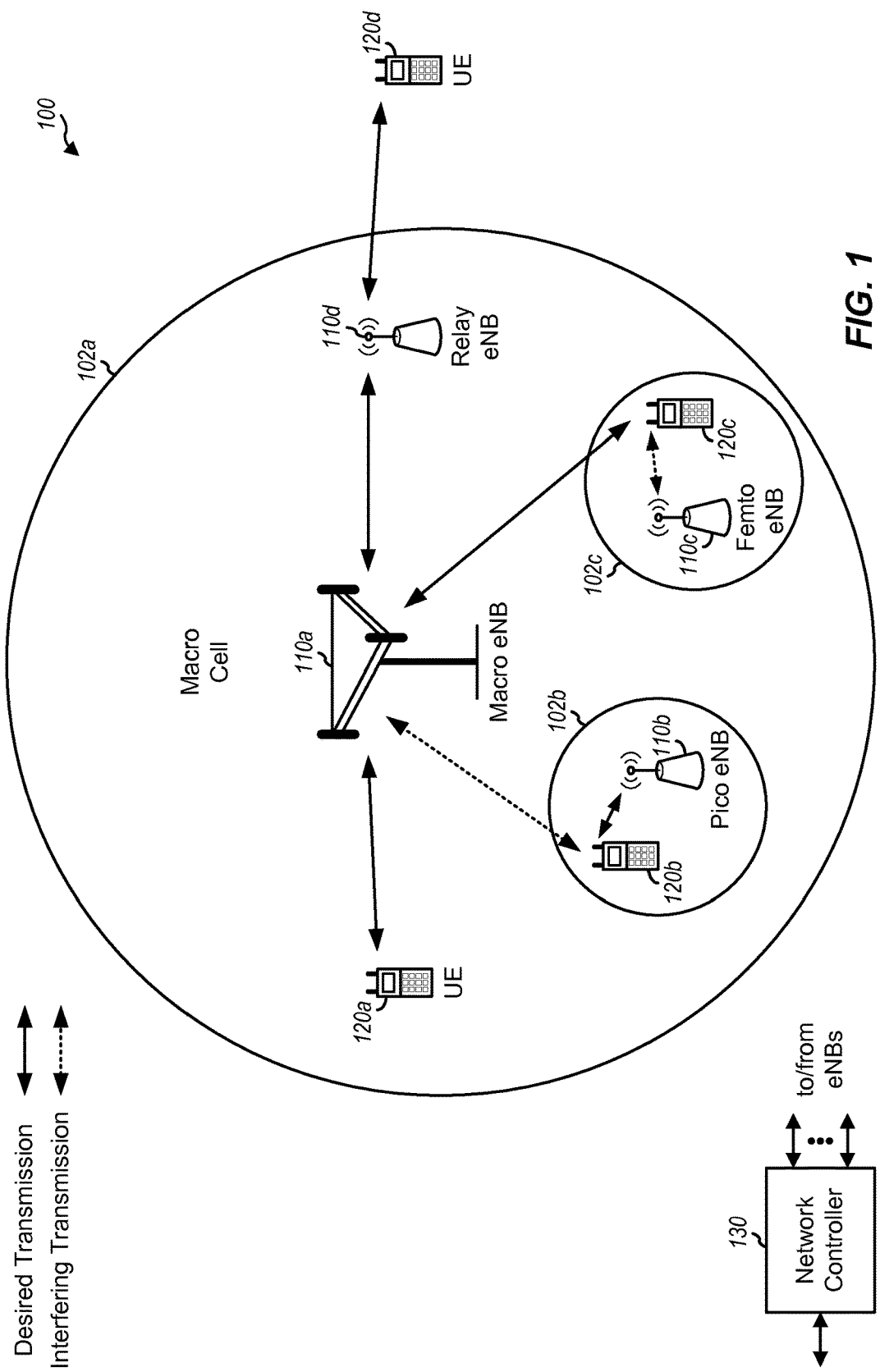
FIG. 1 is a block diagram conceptually illustrating an example of a wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

Figure 2:
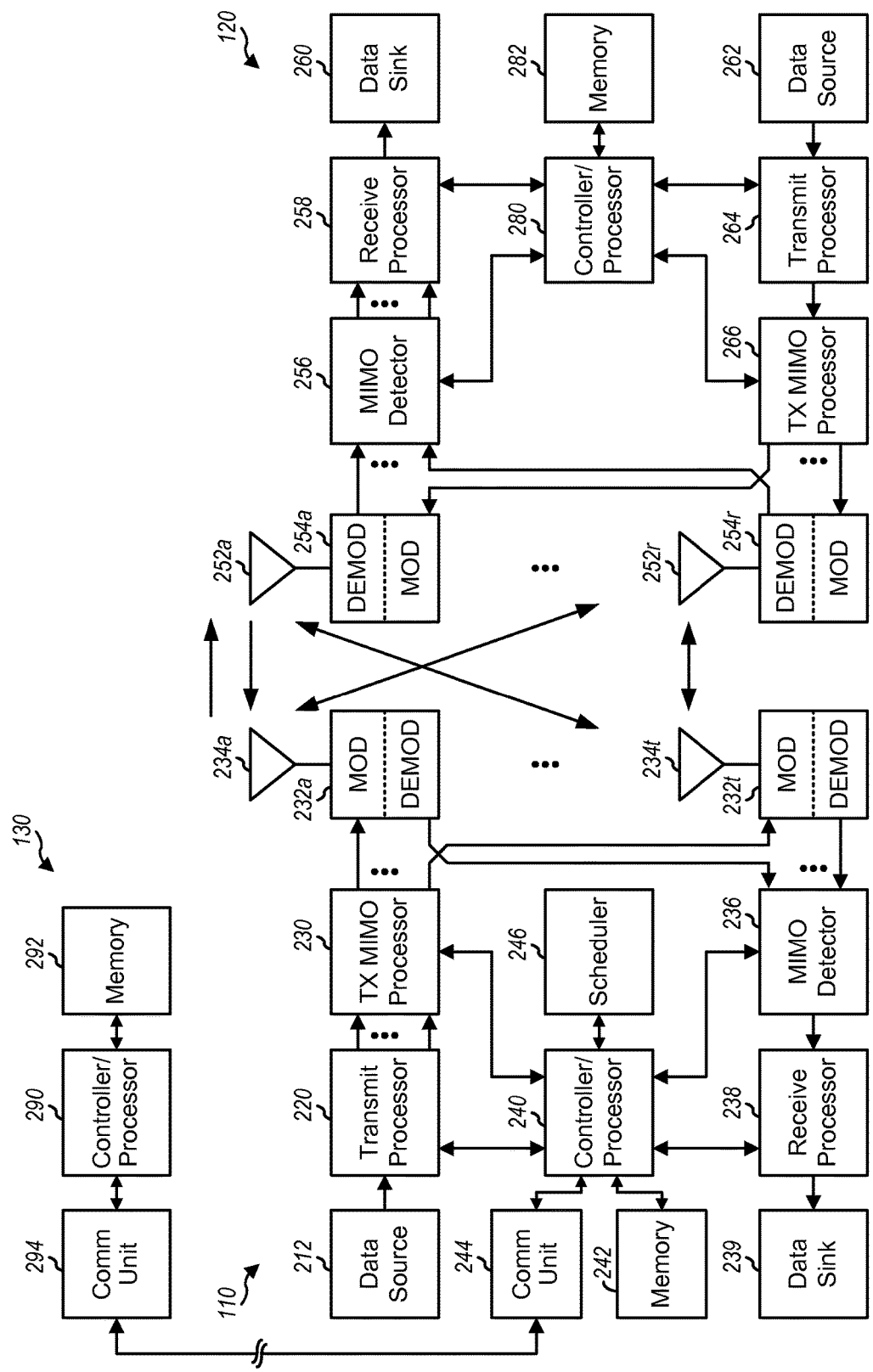
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Processor 240 and/or other processors and modules at base station 110, and/or processor 280 and/or other processors and modules at UE 120, may perform or direct processes for the techniques described herein. Memories 242 and 282 may store data and program codes for base station 110 and UE 120, respectively. A scheduler 246 may schedule UEs for data transmission on the downlink and/or uplink.

When transmitting data to the UE 120, the base station 110 may be configured to determine a bundling size based at least in part on a data allocation size and precode data in bundled contiguous resource blocks of the determined bundling size, wherein resource blocks in each bundle may be precoded with a common precoding matrix. That is, reference signals such as UE-RS and/or data in the resource blocks may be precoded using the same precoder. The power level used for the UE-RS in each RB (resource block) of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous resource blocks (RBs), wherein at least one reference signal in resource blocks in each bundle are precoded with a common precoding matrix, estimate at least one precoded channel based on the determined bundling size and one or more reference signals (RSs) transmitted from the base station, and decode the received bundles using the estimated precoded channel.

Figure 3:
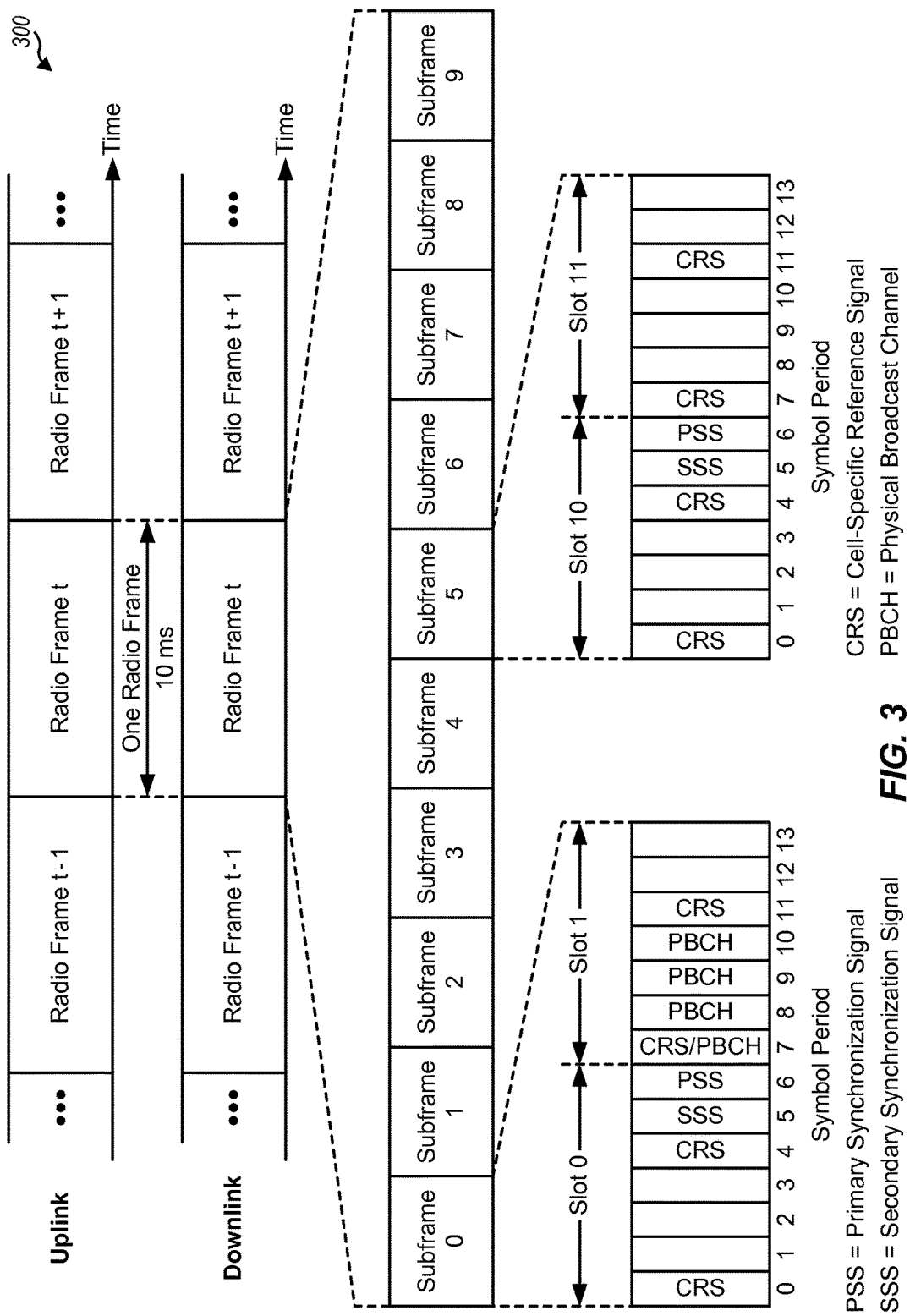
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
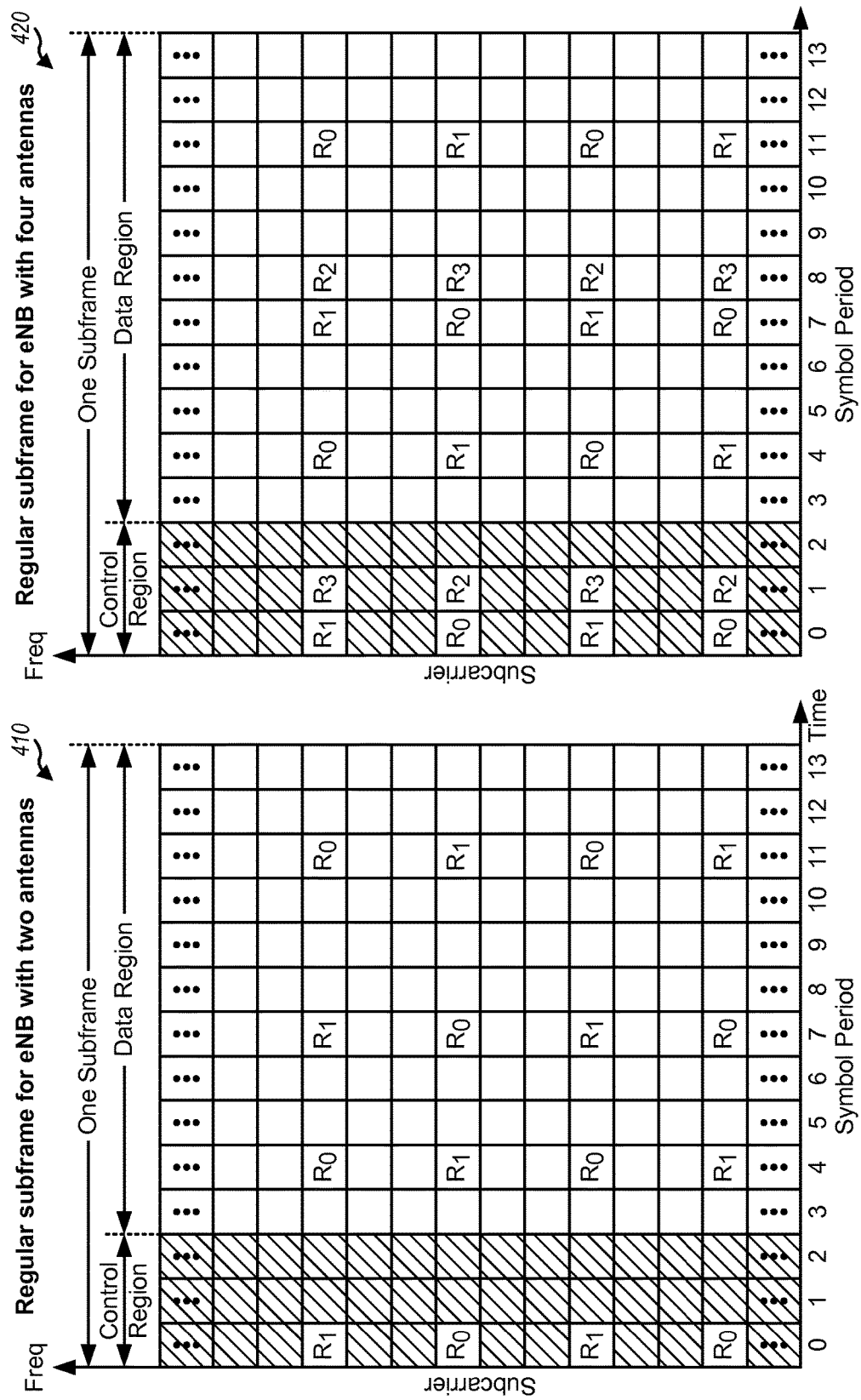
FIG. 4 is a block diagram conceptually illustrating two exemplary subframe formats with the normal cyclic prefix

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Example Uplink Coverage Enhancements

Current long term evolution (LTE) system down link (DL) and uplink (UL) link budgets are designed for coverage of high end devices, such as state-of-the-art smartphones and tablets. However, low cost low rate devices may be supported as well. For example, for machine type communications (MTC), link budget requirements could be increased. For example, a lower data rate (e.g., 10-100 byte payload for uplink) and larger tolerable latency (e.g., 2 seconds to several minutes) may be supported.

Various techniques are provided herein for enhancing UL coverage in a manner that may require little to no hardware changes to a base station. For example, uplink coverage may be enhanced by bundling uplink channels and extended transmission time intervals (TTIs).

For example, M channels may be aggregated. Each channel may carry N bits. Thus, by bundling the M channels, M×N channel bits may be available for transmitting. TTI bundling may be performed by sending a payload of data from a user equipment (such as UE 120) in an uplink control channel over multiple TTIs to base station (such as eNB 110). Different portions of the data may be conveyed in the multiple different TTIs.

According to certain aspects, outer code may then be used to provide coding and gain. Outer code may be, for example, repetition code, Reed-Solomon code, convolutional code, tail-biting convolutional code, turbo code, or low-density parity-check (LDPC) code. The outer coding may be used for error protection of different portions of the payload of data in different TTIs.

For some embodiments, existing physical uplink control channels (PUCCH) and physical random access channels (PRACH) may be aggregated. For example, a low cost device such as a machine type communications (MTC) device (e.g., a relatively low cost UE) may convey data using bundled PUCCH and PRACH.

According to certain aspects, various control channel formats may be used to convey information over multiple TTIs. For example, PUCCH format 1a or 1b may be used. PUCCH format 1a/b may carry 1 bit or 2 bits in each TTI. PUCCH format 1 a/b may be used for UEs with larger path loss. However, for these formats, the number of UEs that can be multiplexed on each channel is small.

According to certain aspects, PUCCH format 3 may be used. PUCCH format 3 may carry 21/22 acknowledgement (ACK)/negative acknowledgment (NACK). PUCCH format 3 may be used for UEs with smaller path loss. For format 3, the number of UEs that can be multiplexed on each channel is large. According to certain aspects, other PUCCH formats may also be used. For some embodiments, selection of which physical channel format is used may be based on a target decoding signal to noise ratio (SNR) of the physical channel, a UE link budget (i.e., dB requirement), or the number of UEs multiplexed on the same channel.

According to certain aspects, selection of the TTI bundling size may be based on payload size, total interference level at the base station, target latency, or the number of bits carried in each TTI.

According to certain aspects, RACH space may be partitioned to carry information bits. For some embodiments, RACH space may be partitioned such that bits of information may be conveyed via different time resources, different frequency resources, or different codes. This approach may have the benefit of being non-coherent with less channel estimation loss at very low SNR.

According to certain aspects, the UE may determine a starting subframe for conveying the data over multiple TTIs. For some embodiments, the starting subframe for a bundled PUCCH may be semi-static or dynamic. A semi-static start frame configuration, based on radio resource control (RRC) signaling, may be desirable if delay is not a concern and may be UE-specific. For some embodiments, the determination of starting subframe may be made based on dynamic scheduling by the base station.

According to certain aspects, the UE may autonomously determine whether to transmit PUCCH in a given TTI. Alternatively, PUCCH transmission may be dependent on receiving a RACH response message from the base station.

According to certain aspects, if a low cost UE and a regular UE are multiplexed in the same physical resource block (PRB) pair, the same spreading sequence length has to be used by the UEs to ensure orthogonality. For regular UEs, either normal or shortened PUCCH format may be configured. Shortened PUCCH format may be used to avoid excessive sounding reference signal (SRS) drops (otherwise, e.g., PUCCH formats 1a, 1b, 2a, 2b, and 3 would force dropping of SRS transmissions). Thus, if a regular UE uses shortened PUCCH, a low cost UE in the same pair may also use shortened PUCCH to ensure orthogonality.

According to certain aspects, the low cost UE may not know whether other regular UEs are in the same PRB pair or not and therefore the low cost UE uses the shortened PUCCH format in cell-specific SRS subframes and the normal format in other subframes as long as there is a regular UE using the shortened PUCCH format.

According to certain aspects, "regular" UEs (e.g., that may not support or require the type of TTI bundling described herein) and low cost UEs may be placed in different PRB pairs and thus, shortened PUCCH format may not be needed if low cost UEs do not support SRS transmissions.

According to certain aspects, the resource for the PUCCH may be layer 3 configured, and the same resource may be used for all subframes in the bundle. Alternatively, resources may be subframe dependent. The resource may be contention based (e.g., with code division multiplexing (CDM)). To minimize collision, different UE offsets may be used. In some embodiments, the UE may transmit the uplink control channel using resource blocks (RBs) in which transmissions from other wireless devices are not multiplexed.

Intra-TTI mirror hopping may be disabled while conveying data over multiple TTIs to allow better filtering. Frequency domain hopping may provide some interference diversity when UEs are assigned different hopping patterns. For example, a UE may assigned one frequency domain hopping pattern, and a different UE may assigned a different frequency hopping pattern, in order to provide intra-cell interference diversity.

A base station (such as eNB 110) may receive the data conveyed from the UE in the uplink control channel over the multiple TTIs and the base station may process the multiple transmissions to assemble the data.

According to certain aspects, the extended TTI may be multiplexed with legacy or new TTI over the same RBs. In some embodiments multiple extended TTI channels may be multiplexed. According to certain aspects, multiplexing of extended TTI with legacy PUCCH and PRACH may done as in Rel-8, 9, or 10.

According to some aspects, each TTI is individually decoded with either hard bits or soft log-likelihood ratios (LLR). Channel estimation may take advantage of longer filter constant (e.g., filtering demodulation reference signal (DM-RS) from multiple TTIs).

Figure 5:
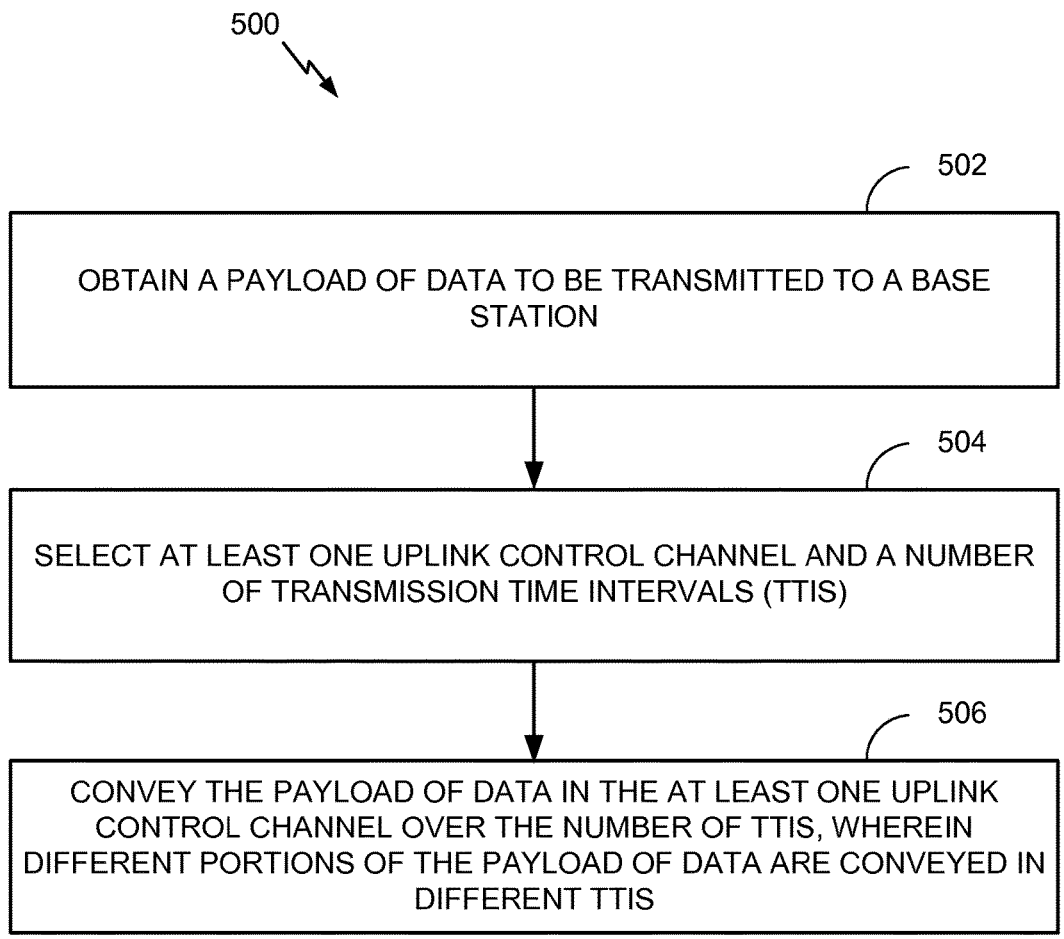
FIG. 5 illustrates example operations for enhanced uplink coverage that may be performed by a wireless device, in accordance with certain aspects of the present disclosure.

FIG. 5 illustrates example operations 500 for enhanced uplink coverage. The operations may be performed, for example, by a wireless device (e.g., a low cost UE).

The operations 500 begin, at 502, by obtaining a payload of data to be transmitted to a base station. At 504, the wireless device (such as UE 120) selects at least one uplink control channel and a number of transmission time intervals (TTIs). In some embodiments, the wireless device may first determine a bundle size to be used and a particular uplink control channel format for conveying the data.

At 506, the wireless device conveys the data in the at least one uplink control channel over the number of TTIs, wherein different portions of the payload of data are conveyed in different TTIs.

Figure 6:
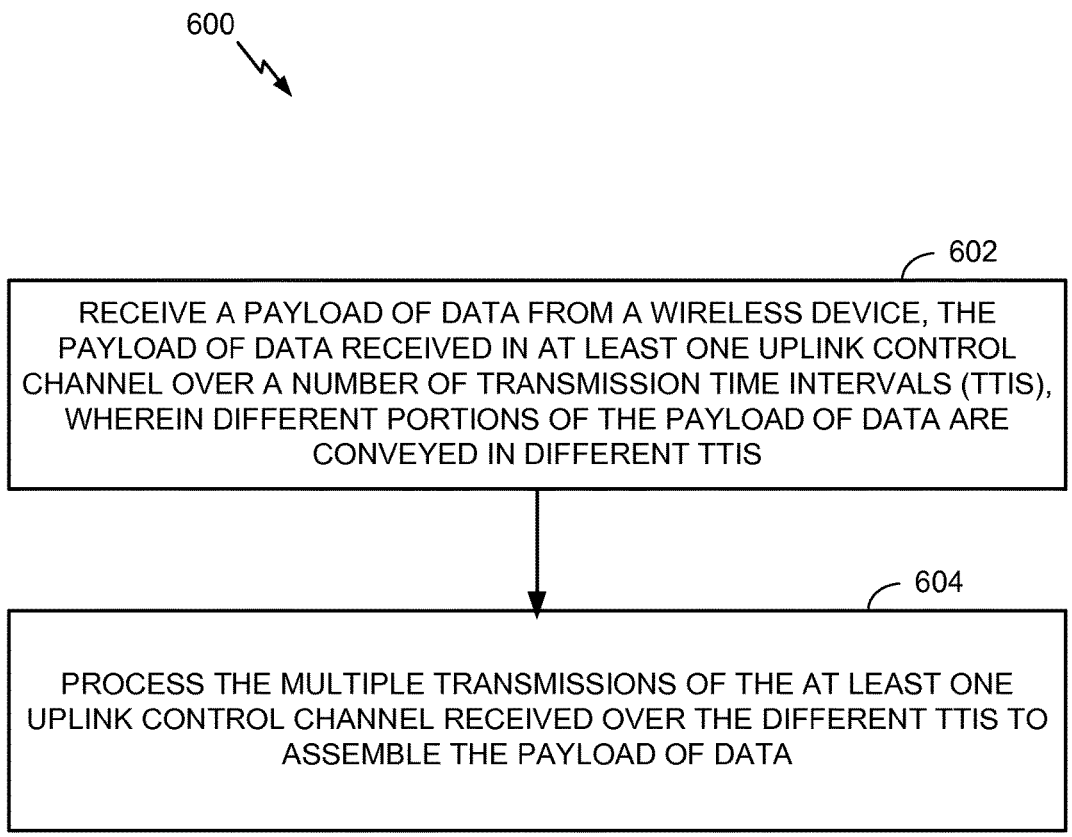
FIG. 6 illustrates example operations for enhanced uplink coverage that may be performed by a base station, in accordance with certain aspects of the present disclosure

FIG. 6 illustrates example operation 600 for enhanced uplink coverage. The operations may be performed, for example, by a base station.

The operations 600, begin, at 602, by receiving a payload of data from a wireless device, the payload of data received in at least one uplink control channel over a number of transmission time intervals (TTIs), wherein different portions of the payload of data are conveyed in different TTIs. For example, the payload of data may be received in a PUCCH or RACH. At 604, the base station processes multiple transmissions of the at least one uplink control channel received over the different TTIs to assemble the payload of data. In some embodiments, the base station may decode each TTI using hard bits or LLR. In some embodiments, the base station may further estimate channel using a long filter constant.

Those of skill would further appreciate that the various illustrative logical blocks, modules, circuits and algorithm steps described in connection with the disclosure herein may be implemented as hardware, software (includes firmware), or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general-purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

As used herein, a phrase referring to "at least one of" a list of items refers to any combination of those items, including single members. As an example, "at least one of: a, b, or c" is intended to cover: a, b, c, a-b, a-c, b-c, and a-b-c.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, PCM (phase change memory), registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Generally, where there are operations illustrated in Figures, those operations may have corresponding counterpart means-plus-function components with similar numbering.

In one or more exemplary designs, the functions described may be implemented in hardware, software, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a wireless device, comprising:
    obtaining a payload of data to be transmitted to a base station;
    selecting at least one uplink control channel and a number of transmission time intervals (TTIs) for bundling one or more transmissions in the at least one uplink control channel, wherein the at least one uplink control channel comprises a random access channel (RACH); and
    transmitting the payload of data in the at least one uplink control channel over the number of TTIs, wherein different portions of the payload of data are transmitted over different TTIs.

2. The method of claim 1, wherein the at least one uplink control channel further comprises a PUCCH.

3. The method of claim 2, wherein different uplink control channel formats indicate different numbers of bits in each TTI.

4. The method of claim 2, further comprising determining a starting subframe for transmitting the payload of data over the number of TTIs.

5. The method of claim 4, wherein the determination is made based on radio resource control (RRC) signaling.

6. The method of claim 4, wherein the determination is made based on dynamic scheduling by the base station.

7. The method of claim 4, further comprising deciding, by the wireless device, whether or not to transmit in the PUCCH in a given TTI based on receiving a RACH response message from the base station.

8. The method of claim 1, wherein different bits of information are conveyed via the use of at least one of: different time resources, different frequency resources, or different codes for the RACH.

9. The method of claim 1, further comprising receiving an assignment indicating a first frequency domain hopping pattern different than a second frequency domain hopping pattern assigned to a different wireless device.

10. The method of claim 1, wherein the transmitting comprises using resource blocks (RBs) in which transmissions from other wireless devices are not multiplexed.

11. The method of claim 1, further comprising applying at least one of repetition code, Reed-Solomon code, convolutional code, tail-biting convolutional code, turbo code, or low-density parity-check (LDPC) code to the payload of data to provide gain.

12. A method for wireless communications by a base station, comprising:
    receiving a payload of data from a wireless device, the payload of data received in at least one uplink control channel over a number of transmission time intervals (TTIs), wherein different portions of the payload of data are received over different TTIs, and wherein the at least one uplink control channel comprises a random access channel (RACH); and
    processing multiple transmissions in the at least one uplink control channel received over the different TTIs to assemble the payload of data.

13. The method of claim 12, wherein the at least one uplink control channel further comprises a PUCCH.

14. The method of claim 12, wherein different uplink control channel formats indicate different numbers of bits in each TTI.

15. The method of claim 14, wherein a format of the at least one uplink control channel is selected based on path loss between the wireless device and the base station.

16. The method of claim 14, wherein a format of the at least one uplink control channel is selected based on a target signal to noise ratio (SNR).

17. The method of claim 14, wherein a format of the at least one uplink control channel is selected based on a link budget of the wireless device.

18. The method of claim 12, wherein a type of the at least one uplink control channel is selected based on a number of wireless devices multiplexed on the same uplink control channel.

19. The method of claim 12, wherein the received payload of data begins in a determined starting subframe.

20. The method of claim 19, further comprising indicating the starting subframe via radio resource control (RRC) signaling.

21. The method of claim 19, further comprising dynamically signaling the starting subframe to the wireless device.

22. The method of claim 19, further comprising indicating the starting subframe via a RACH response message.

23. The method of claim 12, wherein different bits of information are conveyed via the use of at least one of: different time resources, different frequency resources, or different codes for the RACH.

24. The method of claim 12, wherein the at least one uplink control channel is received in resource blocks (RBs) in which transmissions from other wireless devices are not multiplexed.

25. The method of claim 12, wherein at least one of repetition code, Reed-Solomon code, convolutional code, tail-biting convolutional code, turbo code, or low-density parity-check (LDPC) code is used for error protection of different portions of the payload of data received over the multiple TTIs.

26. The method of claim 12, wherein the number of TTIs is determined based on at least one of: size of the payload of data to be transmitted, interference level at the base station, a target latency, or a number of bits transmitted in each TTI.

27. The method of claim 12, wherein the payload of data from the wireless device has a first frequency domain hopping pattern, and wherein the method further comprises receiving another payload of data from a different wireless device that has a second frequency domain hopping pattern.

28. The method of claim 12, further comprising decoding each TTI using at least one of hard bits or soft log-likelihood ratio (LLR).

29. An apparatus for wireless communications by a wireless device, comprising:
   means for obtaining a payload of data to be transmitted to a base station;
   means for selecting at least one uplink control channel and a number of transmission time intervals (TTIs), wherein the at least one uplink control channel comprises a random access channel (RACH); and
   means for transmitting the payload of data in the at least one uplink control channel over the number of TTIs, wherein different portions of the payload of data are transmitted over different TTIs.

30. An apparatus for wireless communications by a base station, comprising:
   means for receiving a payload of data from a wireless device, the payload of data received in at least one uplink control channel over a number of transmission time intervals (TTIs), wherein different portions of the payload of data are received over different TTIs, and wherein the at least one uplink control channel comprises a random access channel (RACH); and
   means for processing multiple transmissions in the at least one uplink control channel received over the different TTIs to assemble the payload of data.

* * * * *